United States Patent [19]

Wang et al.

[11] Patent Number: 5,264,197

[45] Date of Patent: Nov. 23, 1993

[54] SOL-GEL PROCESS FOR PROVIDING A TAILORED GEL MICROSTRUCTURE

[75] Inventors: Shiho Wang, Ventura; Satyabrata Raychaudhuri, Agoura; Arnab Sarkar, West Hills, all of Calif.

[73] Assignee: Yazaki Corporation, Tokyo, Japan

[21] Appl. No.: 811,326

[22] Filed: Dec. 20, 1991

[51] Int. Cl.$^5$ .................... B01J 13/00; C01B 33/158
[52] U.S. Cl. ................. 423/338; 252/315.6; 501/12
[58] Field of Search ............ 252/315.01, 315.6, 315.7; 501/12; 423/338

[56] References Cited

U.S. PATENT DOCUMENTS

| | | | |
|---|---|---|---|
| 2,794,002 | 5/1957 | Haensel et al. | 423/338 |
| 3,146,252 | 8/1964 | Emblem et al. | 252/315.6 X |
| 3,672,833 | 6/1972 | Teichner et al. | 423/338 |
| 4,323,381 | 4/1982 | Matsuyama et al. | 423/338 X |
| 4,554,211 | 11/1985 | Arika et al. | 252/315.6 X |
| 4,806,328 | 2/1989 | Van Lierop et al. | 423/338 |
| 4,851,150 | 7/1989 | Hench et al. | 252/315.6 |
| 5,023,208 | 6/1991 | Pope et al. | 501/12 |

*Primary Examiner*—Richard D. Lovering
*Attorney, Agent, or Firm*—Pretty, Schroeder Brueggemann & Clark

[57] ABSTRACT

An improved sol-gel process for fabricating large, crack-free gel monoliths (e.g., of silica) is described in which a specially-tailored gel microstructure is provided by adjusting the relative concentrations of an alcohol diluent (e.g., ethanol) and/or one or more catalysts (e.g., HCl and HF). Controlled variations in the gel's average pore radius, bulk density, rupture modulus, and elastic modulus over a wide range can be tailored in this fashion. This enables the process to be optimized for the particular application involved.

15 Claims, No Drawings

SOL-GEL PROCESS FOR PROVIDING A TAILORED GEL MICROSTRUCTURE

BACKGROUND OF THE INVENTION

This invention relates generally to sol-gel processes for producing monolithic articles of glass and, more particularly, to processes of this kind that are adapted to eliminate cracking of the gel during a final drying step.

High purity glass components typically are fabricated either by melting solid raw materials or by vapor deposition. Melting solid raw materials is a generally effective technique, but difficulty is sometimes encountered in maintaining purity, due to recontamination from processing containers. In addition, energy costs due to high temperature processing can sometimes be excessive, and finishing costs to produce components of the desired final shapes can also sometimes be excessive. Vapor deposition likewise is a generally effective technique for fabricating high purity glass components. However, it too can be very expensive due to a relatively low material collection efficiency, a high investment cost in processing and pollution control equipment, and slow processing rates.

Research has recently been conducted into the use of a sol-gel process for fabricating high purity monolithic articles of glass. In such processes, a desired solution of glass-forming compounds, solvents and catalysts, i.e., sol, is poured into a mold and allowed to react. Following hydrolysis and condensation reactions, the sol forms a porous matrix of solids, i.e., gel. With additional time, the gel shrinks in size by expelling fluids from its pores. The wet gel is then dried in a controlled environment, to remove remaining liquid from its pores, and it is then densified into a solid monolith.

Advantages of the sol-gel process include chemical purity and homogeneity, flexibility in the selection of compositions, relatively low temperature processing, and the production of monolithic articles close to their desired final shapes, thereby minimizing finishing costs. Nevertheless, the sol-gel process has generally proven to be difficult to use in producing monoliths that are large and free of cracks. These cracks arise during the final drying step of the process, and they are believed to result from stresses due to capillary forces in the gel pores.

Efforts to eliminate the cracking problem during the fabrication of dry sol-gel monoliths have been diverse. In one technique, the gel is dried above the supercritical temperature and pressure of the pore fluid. In another technique, the wet gel body is placed inside a closed container with a few pinholes for venting the evaporating pore liquid in a slow, controlled fashion. In yet another technique, described in U.S. Pat. No. 5,023,208, the pore size of the wet gel is enlarged by a hydrothermal aging treatment prior to drying. The enlarged pore size substantially reduces the capillary stresses generated during drying, so as to substantially reduce the possibility of cracking.

Most of these techniques for eliminating the cracking problem are directed towards manipulating the drying process parameters so as to minimize the capillary stresses, without any particular emphasis on the microstructure of the wet gel and its pristine strength, prior to the start of the drying process. However, if the strength of the wet gel can be increased substantially by tailoring the sol composition and the correct choice of catalyst before the drying process in initiated, it is expected that the gel's resistance to cracking will be much higher. Chances of failure can thereby be minimized substantially. It should be pointed out that, except in the case of the supercritical drying, capillary stresses will always be generated in the gel body irrespective of the drying technique being used. Therefore, an increase of the gel's strength prior to drying usually is advantageous. The gel's strength, of course, is determined by its microstructure.

It also is important to note that the gel's microstructure, in combination with the drying process, has a significant effect on the ability to fabricate large, dry gel monoliths that are free of cracks. For example, it is extremely difficult to fabricate a large, crack-free dry gel structure, e.g., a 3000 cc cylindrical shape, using the supercritical drying process, if the gel has an average pore radius of only 10 Angstroms, even though capillary pressure is non-existent. Gels having an average pore radius on the order of 100 Angstroms, on the other hand, are more suitable for this purpose. Conversely, large, crack-free gels of the same size dried by a pinhole drying process, or any other slow-drying process, are best fabricated by configuring the gels to have smaller average pore radii, e.g., 20 to 30 Angstroms. This is because smaller pore radii impart higher rupture modulus and density to the gel. The gels thereby have a higher probability of withstanding the capillary stress.

It should therefore be appreciated that there is a need for an ability to tailor the gel microstructure so as to obtain desired mechanical and structural properties for the gel prior to the drying process. The present invention satisfies this need.

SUMMARY OF THE INVENTION

The present invention resides in a sol-gel process for fabricating monoliths of glass by tailoring the wet gel microstructure prior to the start of the drying process. In the case of silica, a sol is prepared by reacting the alkoxide tetraethyl orthosilicate with deionized water, in the presence of an alcohol diluent and a catalyst. After thorough mixing, the sol is poured into a mold and allowed to stand at room temperature for several hours. With time, the solution gels and takes the shape of the mold. A wet gel structure with a high concentration of microscopic pores is thus formed. In accordance with the present invention, certain gel properties such as average pore size, pore surface area, total pore volume, bulk density, rupture modulus, and tensile modulus, can be tailored to satisfy certain desired needs by adjusting the relative concentrations of the alcohol diluent and catalyst in the initial sol.

More particularly, when the alcohol is ethanol and the catalysts are hydrofluoric acid (HF) and hydrochloric acid (HCl), average pore radii in the dry gel can be tailored to selected values in the range of 10 to 100 Angstroms by controlling the relative concentrations of the ethanol and the catalyst. Correspondingly, the gel's surface area can be tailored to selected values in the range of 600 to 1100 $m^2$ per gram, and the gel's total pore volume can be tailored to selected values in the range of 0.7 to 3.6 cc per gram.

In another feature of the invention, it has been discovered that gel microstructure parameters such as average pore radius, surface area, and total pore volume can be selected merely by varying the amount of alcohol included in the sol despite the type of catalyst used. Similarly, when both HF and HCl catalysts are used, the gel's average pore radius can be selected merely by varying the concentration of HF in the sol while maintaining the concentration of HCl constant. Further, the gel's bulk density can be selected merely by varying the concentration of HF in the sol while maintaining constant the concentration of HCl.

Further, the wet gel's rupture modulus and elastic modulus can be controllably selected merely by varying the amount of ethanol in the sol. This behavior was observed for gels prepared using only HF as the catalyst as well as for gels prepared using HF and HCl in combination as the catalyst. Rupture moduli in the range of 0.1 to 2.0 megapascals and elastic moduli in the range of 1.0 to 40 megapascals can be tailored in this fashion.

Other features and advantages of the present invention should become apparent from the following detailed description, which sets forth, by way of example, several preferred processes of the invention.

DETAILED DESCRIPTION OF THE INVENTION

This invention resides in a sol-gel process for fabricating large monoliths of silica having a desired microstructure that imparts certain physical strength characteristics that make the monolith particularly useful in certain applications. In the case of silica, a sol is formed by mixing tetraethyl orthosilicate or TEOS (($C_2H_5O)_4Si$) with deionized water, a diluent, e.g., ethyl alcohol or ethanol ($C_2H_5OH$), and a catalyst, e.g., hydrofluoric acid (HF) and/or hydrochloric acid (HCl). After stirring and placing in a suitable mold, hydrolysis and polymerization reactions occur, and a gel begins to form. These reactions are as follows:

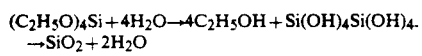

$$(C_2H_5O)_4Si + 4H_2O \rightarrow 4C_2H_5OH + Si(OH)_4 Si(OH)_4 \rightarrow SiO_2 + 2H_2O$$

After the hydrolysis and polymerization reactions are complete or near complete, the resulting porous silicon dioxide ($SiO_2$) gel matrix is dried. The microstructure of the gel matrix can have a significant effect on the ability of the wet silica gel body or monolith to withstand any capillary forces encountered as the liquid dries from the minute pores of the matrix. In accordance with the invention, this microstructure is specially tailored so as to impart to the wet gel monolith certain desired physical strength characteristics that enable it to withstand these capillary forces. This tailoring is achieved by carefully adjusting the relative concentrations of the ethanol diluent and the HF and HCl catalysts.

The process of the invention will be better understood with reference to the illustrative examples set forth below.

Tailoring of Gel Microstructure through Variations of the Alcohol Content in the Sol

Examples 1-5

In Example 1-3, three solutions were prepared by mixing 1.0 mole of TEOS in each case with 4.0 moles of ethanol (Example 1), 3.0 moles of ethanol (Example 2), and 2.0 moles of ethanol (Example 3) in separate containers, under continuous stirring. Another three solutions were prepared by mixing 0.05 mole of HF with 4.0 moles of deionized water. The second solutions were then added to the first three solutions, and stirring continued for 30 minutes. The resulting clear solutions were then poured into cylindrical containers and allowed to gel at room temperature.

In Example 4 and 5, two identical solutions were prepared by mixing 0.02 mole of HCl with 4.0 moles of deionized water. A separate solution was prepared by mixing 1.0 mole of TEOS with 1.0 mole of ethanol. One HCl/water solution was added to this TEOS/ethanol solution, under continuous stirring (Example 4), while the other HCl/ethanol solution was added to 1.0 mole of TEOS, under continuous stirring (Example 5). Finally, 0.05 mole of HF was added dropwise to both solutions, and these final sols were poured into cylindrical molds and allowed to gel at room temperature.

Wet gels prepared in accordance with these examples were aged for one week, at 70° C., and they were subsequently dried under controlled conditions. Microstructural data on each of these dry gels were collected using an Autosorb-6 BET machine. These data are summarized in Table 1.

TABLE 1

| Example | TEOS (Mole) | Ethanol (Mole) | Deion. Water (Mole) | HCl (Mole) | HF (Mole) | Average Pore Radius (Ang.) | Surface Area ($m^2$/gm) | Total Pore Volume (cc/gm) |
|---|---|---|---|---|---|---|---|---|
| 1 | 1.0 | 4.0 | 4.0 |  | 0.05 | 80–100 | 550 | 3.50 |
| 2 | 1.0 | 3.0 | 4.0 |  | 0.05 | 60 | 650 | 2.61 |
| 3 | 1.0 | 2.0 | 4.0 |  | 0.05 | 50 | 750 | 2.00 |
| 4 | 1.0 | 1.0 | 4.0 | 0.02 | 0.05 | 20 | 900 | 1.65 |
| 5 | 1.0 | 0.0 | 4.0 | 0.02 | 0.05 | 10 | 1100 | 0.716 |

Examples 6-8

In Examples 6-8, three wet gel samples were prepared using 1.0 mole of TEOS, 4.0 moles of deionized water, and 1.0 mole of ethanol (Example 6), 2.0 moles of ethanol (Example 7), and 4.0 moles of ethanol (Example 8). Two catalysts, including 0.02 mole of HCl together with 0.10 mole of HF, were used in all three examples. The mixing sequence of chemicals was the same as described in Examples 1-5. The wet gels prepared in this way were aged for one week, at 70° C., and they were subsequently dried under controlled conditions. Microstructural data on each of these dry gels were collected using an Autosorb-6 BET machine. These data are shown in Table 2.

TABLE 2

| Example | TEOS (Mole) | Ethanol (Mole) | Deion. Water (Mole) | HCl (Mole) | HF (Mole) | Average Pore Radius (Ang.) |
|---|---|---|---|---|---|---|
| 6 | 1.0 | 1.0 | 4.0 | 0.02 | 0.10 | 40 |
| 7 | 1.0 | 2.0 | 4.0 | 0.02 | 0.10 | 50 |
| 8 | 1.0 | 4.0 | 4.0 | 0.02 | 0.10 | 80 |

The data of Tables 1 and 2 show that increasing the concentration of the ethanol diluent, while maintaining constant the concentrations of the TEOS and deionized water reactants and the catalyst(s), brings about an increased average pore radius, a decreased surface area per unit weight, and an increased total pore volume per unit weight.

Tailoring of Gel Microstructure through Variations of HF Catalyst While HCl Catalyst Remains Constant Examples 9-12

In Examples 9-12, four wet gel samples were prepared using 1.0 mole of TEOS, 1.0 mole of ethanol, 4.0 moles of deionized water, and 0.02 mole of HCl. Further, an HF catalyst was added in the amounts of 0.03 mole in Example 9, 0.05 mole in Example 10, 0.07 mole in Example 11, and 0.10 mole in Example 12. In each case, the mixing sequence of chemicals was as described in Examples 1-5. The wet gel samples were aged for one week, at 70° C., and the samples were then dried under controlled conditions. The microstructural properties were analyzed using an Autosorb-6 BET machine, and the results of that analysis are summarized in Table 3.

TABLE 3

| Example | TEOS (Mole) | Ethanol (Mole) | Deion. Water (Mole) | HCl (Mole) | HF (Mole) | Average Pore Radius (Ang.) |
|---|---|---|---|---|---|---|
| 9 | 1.0 | 1.0 | 4.0 | 0.02 | 0.03 | 15 |
| 10 | 1.0 | 1.0 | 4.0 | 0.02 | 0.05 | 20 |
| 11 | 1.0 | 1.0 | 4.0 | 0.02 | 0.07 | 30 |
| 12 | 1.0 | 1.0 | 4.0 | 0.02 | 0.10 | 40 |

Examples 13-17

In Examples 13-17, five wet gel samples were prepared using 1.0 mole of TEOS, 2.0 moles of ethanol, 4.0 moles of deionized water, and 0.02 mole of HCl. Further, an HF catalyst was added in the amounts of 0.01 mole in Example 13, 0.03 mole in Example 14, 0.05 mole in Example 15, 0.07 mole in Example 16, and 0.10 mole in Example 17. In each case, the mixing sequence of chemicals was as described in Examples 1-5. The wet gel samples were aged for one week, at 70° C., and the samples were then dried under controlled conditions. The microstructural properties were analyzed using an Autosorb-6 BET machine, and the results of than analysis are summarized in Table 4.

TABLE 4

| Example | TEOS (Mole) | Ethanol (Mole) | Deion. Water (Mole) | HCl (Mole) | HF (Mole) | Average Pore Radius (Ang.) |
|---|---|---|---|---|---|---|
| 13 | 1.0 | 2.0 | 4.0 | 0.02 | 0.01 | 10 |
| 14 | 1.0 | 2.0 | 4.0 | 0.02 | 0.03 | 12 |
| 15 | 1.0 | 2.0 | 4.0 | 0.02 | 0.05 | 20 |
| 16 | 1.0 | 2.0 | 4.0 | 0.02 | 0.07 | 30 |
| 17 | 1.0 | 2.0 | 4.0 | 0.02 | 0.10 | 50 |

Examples 18-22

In Examples 18-22, five wet gel samples were prepared using 1.0 mole of TEOS, 4.0 moles of ethanol, 4.0 moles of deionized water, and 0.02 mole of HCl. Further, an HF catalyst was added in the amounts of 0.01 moles in Example 18, 0.03 mole in Example 19, 0.05 mole in Example 20, 0.07 mole in Example 21, and 0.10 mole in Example 22. In each case, the mixing sequence of chemicals was as described in Examples 1-5. The wet gel samples were aged for one week, at 70° C., and the samples were then dried under controlled conditions. The microstructural properties were analyzed using an Autosorb-6 BET machine, and the results of that analysis are summarized in Table 5.

TABLE 5

| Example | TEOS (Mole) | Ethanol (Mole) | Deion. Water (Mole) | HCl (Mole) | HF (Mole) | Average Pore Radius (Ang.) |
|---|---|---|---|---|---|---|
| 18 | 1.0 | 4.0 | 4.0 | 0.02 | 0.01 | 12 |
| 19 | 1.0 | 4.0 | 4.0 | 0.02 | 0.03 | 15 |
| 20 | 1.0 | 4.0 | 4.0 | 0.02 | 0.05 | 20 |
| 21 | 1.0 | 4.0 | 4.0 | 0.02 | 0.07 | 30 |
| 22 | 1.0 | 4.0 | 4.0 | 0.02 | 0.10 | 40 |

The data of Tables 3, 4 and 5 show that increasing the concentration of the HF catalyst, while maintaining constant the concentrations of the TEOS and deionized water reactants, the ethanol diluent, and the HCl catalyst, brings about an increase in the average pore radius of the resulting dry gel.

Tailoring of Gel Bulk Density

The dry gel samples of Examples 9-22 also were tested for bulk density. The test results are presented in Table 6. They show that increasing the concentration of the HF catalyst, while maintaining constant the concentrations of the TEOS and deionized water reactants, the ethanol diluent, and the HCl catalyst, brings about a reduction in the dry gel's bulk density. The test results further show that increasing the concentration of the ethanol diluent, while maintaining constant the concentrations of the TEOS and deionized water reactants and the HCl and HF catalysts, brings about an increase in the dry gel's bulk density for ethanol concentrations in the range of 1.0 to 2.0 moles. That same variation, however, appears to have an inconclusive effect on the dry gel's bulk density for ethanol concentrations in the range of 2.0 to 4.0 moles.

TABLE 6

| Example | TEOS (Mole) | Ethanol (Mole) | Deion. Water (Mole) | HCl (Mole) | HF (Mole) | Bulk Density (gms/cc) |
|---|---|---|---|---|---|---|
| 9 | 1.0 | 1.0 | 4.0 | 0.02 | 0.03 | 0.597 |
| 10 | 1.0 | 1.0 | 4.0 | 0.02 | 0.05 | 0.409 |
| 11 | 1.0 | 1.0 | 4.0 | 0.02 | 0.07 | 0.412 |
| 12 | 1.0 | 1.0 | 4.0 | 0.02 | 0.10 | 0.359 |
| 13 | 1.0 | 2.0 | 4.0 | 0.02 | 0.01 | 1.12 |
| 14 | 1.0 | 2.0 | 4.0 | 0.02 | 0.03 | 0.911 |
| 15 | 1.0 | 2.0 | 4.0 | 0.02 | 0.05 | 0.764 |
| 16 | 1.0 | 2.0 | 4.0 | 0.02 | 0.07 | 0.664 |
| 17 | 1.0 | 2.0 | 4.0 | 0.02 | 0.10 | 0.576 |
| 18 | 1.0 | 4.0 | 4.0 | 0.02 | 0.01 | 0.885 |
| 19 | 1.0 | 4.0 | 4.0 | 0.02 | 0.03 | 0.867 |
| 20 | 1.0 | 4.0 | 4.0 | 0.02 | 0.05 | 0.761 |
| 21 | 1.0 | 4.0 | 4.0 | 0.02 | 0.07 | 0.656 |
| 22 | 1.0 | 4.0 | 4.0 | 0.02 | 0.10 | 0.567 |

Tailoring of Gel Elastic Modulus and Rupture Modulus

Examples 23-25

In Examples 23-25, three wet gel samples were prepared using 1.0 mole of TEOS, 3.0 moles of ethanol, 4.0 moles of deionized water, and 0.02 mole of HCl. Further, an HF catalyst was added in the amounts of 0.03 mole in Example 23, 0.05 mole in Example 24, and 0.10 mole in Example 25. In each case, the mixing sequence of chemicals was as described in Examples 1-5. The wet gel samples were aged for one week, at 70° C., and while still submerged in ethanol were tested using a three-point bend tester by fracture to determine their elastic moduli and rupture moduli. At the same time, the wet gel samples of Examples 9, 10, 12, 14, 15, 17, 19, 20 and 22 were similarly tested to determine their elastic moduli and rupture moduli.

The results of these tests are presented in Table 7. The results show that increasing the HF catalyst concentration, while maintaining constant the concentrations of the TEOS and deionized water reactants, the ethanol diluent, and the HCl catalyst, generally decreases both the wet gel's elastic modulus and the rupture modulus of the wet gel. At the same time, the results show that increasing the ethanol concentration, while maintaining constant the concentrations of the TEOS and deionized water reactants and HF and HCl catalysts, generally brings about a decrease in the gel's elastic modulus and rupture modulus. This would intuitively follow from the increased average pore size brought about by these same variations.

TABLE 7

| Example | TEOS (Mole) | Ethanol (Mole) | Deion. Water (Mole) | HCl (Mole) | HF (Mole) | Elastic Modulus (MPa) | Rupture Modulus (MPa) |
|---|---|---|---|---|---|---|---|
| 9 | 1.0 | 1.0 | 4.0 | 0.02 | 0.03 | 40.83 | 2.0 |
| 14 | 1.0 | 2.0 | 4.0 | 0.02 | 0.03 | 30.23 | 1.54 |
| 23 | 1.0 | 3.0 | 4.0 | 0.02 | 0.03 | 20.08 | 1.10 |
| 19 | 1.0 | 4.0 | 4.0 | 0.02 | 0.03 | 5.54 | 0.23 |
| 10 | 1.0 | 1.0 | 4.0 | 0.02 | 0.05 | 28.15 | 1.61 |
| 15 | 1.0 | 2.0 | 4.0 | 0.02 | 0.05 | 6.90 | 0.44 |
| 24 | 1.0 | 3.0 | 4.0 | 0.02 | 0.05 | 20.08 | 1.10 |
| 20 | 1.0 | 4.0 | 4.0 | 0.02 | 0.05 | 6.55 | 0.36 |
| 12 | 1.0 | 1.0 | 4.0 | 0.02 | 0.10 | 5.99 | 0.26 |
| 17 | 1.0 | 2.0 | 4.0 | 0.02 | 0.10 | 3.97 | 0.20 |
| 25 | 1.0 | 3.0 | 4.0 | 0.02 | 0.10 | 2.14 | 0.13 |
| 22 | 1.0 | 4.0 | 4.0 | 0.02 | 0.10 | 1.76 | 0.10 |

The gel samples of Examples 3-5 also were tested for elastic moduli and rupture moduli, while still wet and immersed in ethanol. The tests were conducted using a three-point bend tester by fracture. The test results, which are presented in Table 8, confirm the conclusions from the data of Table 7. In particular, the tests results show that increasing the concentration of the ethanol diluent, while maintaining constant the concentrations of the TEOS and deionized water reactants and the single HF catalyst, brings about a decrease in both the elastic modulus and the rupture modulus of the wet gel.

TABLE 8

| Example | TEOS (Mole) | Ethanol (Mole) | Deion. Water (Mole) | HCl (Mole) | HF (Mole) | Elastic Modulus (MPa) | Rupture Modulus (MPa) |
|---|---|---|---|---|---|---|---|
| 3 | 1.0 | 2.0 | 4.0 | — | 0.05 | 3.02 | 0.16 |
| 4 | 1.0 | 3.0 | 4.0 | — | 0.05 | 3.16 | 0.14 |
| 5 | 1.0 | 4.0 | 4.0 | — | 0.05 | 2.43 | 0.12 |

It should be appreciated from the foregoing detailed description that the present invention provides a technique for tailoring various microstructure characteristics of a gel (e.g., silica) fabricated using a sol-gel process, by adjusting the relative concentrations of an alcohol diluent (e.g., ethanol) and/or one or more catalysts (e.g., HCl and HF). Controlled variations in the gel's average pore radius, bulk density, rupture modulus, and elastic modulus over a wide range can be tailored in this fashion. This enables the process to be optimized for the particular application involved.

Although the invention has been described in detail with reference only to the examples set forth above, those of ordinary skill in the art will appreciate that various modifications can be made without departing from the invention. Accordingly, the invention is defined only by the following claims.

We claim:

1. A method for forming a dry gel body comprising the steps of:
    selective effective amounts of an alkyl orthosilicate, water, an alcohol, and a catalyst comprising a mixture of hydrofluoric acid and hydrochloric acid;
    reacting together the selected amounts of the alkyl orthosilicate and water, in the presence of the selected amounts of the alcohol and the catalyst, to form a wet gel having a desired average pore radius; and
    drying the wet gel;
    wherein the amounts of the alcohol and the catalyst selected in the step of selecting are selected so as to provide the wet gel with certain microstructural features that increase the strength of the wet gel to withstand capillary stresses, thereby substantially eliminating the possibility of the gel cracking during the drying step.

2. A method as defined in claim 1, wherein:
    the alkyl orthosilicate selected in the step of selecting includes tetraethyl orthosilicate;
    the alcohol selected in the step of selecting is ethanol; and
    the amounts of ethanol and the catalyst selected in the step of selecting are selected so as to provide a gel having an average pore radius in the range of about 10 to 100 Angstroms.

3. A method as defined in claim 2, wherein the relative proportions of tetraethyl orthosilicate, water, and ethanol selected in the step of selecting are 1 mole, 4 moles, and up to 4 moles, respectively.

4. A method as defined in claim 3, wherein the relative proportions of the catalyst selected in the step of selecting are up to 0.1 moles hydrofluoric acid and up to 0.02 moles hydrochloric acid.

5. A method as defined in claim 1, wherein:

the alkyl orthosilicate selected in the step of selecting includes tetraethyl orthosilicate;

the alcohol selected in the step of selecting is ethanol; and the amounts of ethanol and the catalyst selected in the step of selecting are selected so as to provide a dry gel having a bulk density in the range of 0.3 to 1.2 grams per cc.

6. A method as defined in claim 5, wherein the relative proportions of tetraethyl orthosilicate, water, and ethanol selected in the step of selecting are 1 mole 4 moles and up to 4 moles, respectively.

7. A method as defined in claim 6, wherein the relative proportions of the catalyst selected in the step of selecting are up to 0.1 moles hydrofluoric acid and about 0.02 moles hydrochloric acid.

8. A method as defined in claim 1, wherein:

the alkyl orthosilicate selected in the step of selecting includes tetraethyl orthosilicate;

the alcohol selected in the step of selecting is ethanol; and the amounts of ethanol and the catalyst selected in the step of selecting are selected so as to provide a wet gel having a rupture modulus of at least 0.1 megapascals.

9. A method as defined in claim 8, wherein the relative proportions of tetraethyl orthosilicate, water, and ethanol selected in the step of selecting are 1 mole, 4 moles, and up to 4 moles, respectively.

10. A method as defined in claim 9, wherein the relative proportions of the catalyst selected in the step of selecting are up to 0.1 moles hydrofluoric acid and about 0.02 moles hydrochloric acid.

11. A method as defined in claim 1, wherein: the alkyl orthosilicate selected in the step of selecting includes tetraethyl orthosilicate;

the alcohol selected in the step of selecting is ethanol; and the amounts of ethanol and the catalyst selected in the step of selecting are selected so as to provide a wet gel having a elastic modulus of at least 1.0 megapascals.

12. A method as defined in claim 11, wherein the relative proportions of tetraethyl orthosilicate, water, and ethanol selected in the step of selecting are 1 mole, 4 moles, and up to 4 moles, respectively.

13. A method as defined in claim 12, wherein the relative proportions of the catalyst selected in the step of selecting are up to 0.1 moles hydrofluoric acid and about 0.02 moles hydrochloric acid.

14. A method as defined in claim 1, wherein:

the alkyl orthosilicate selected in the step of selecting includes tetraethyl orthosilicate;

the alcohol selected in the step of selecting is ethanol; and the relative proportions of alkyl orthosilicate, water, and alcohol selected in the step of selecting are 1 mole, 4 moles, and up to 4 moles, respectively.

15. A method as defined in claim 14, wherein the relative proportions of the catalyst selected in the step of selecting are up to 0.1 moles hydrofluoric acid and about 0.02 moles hydrochloric acid.

* * * * *